United States Patent [19]

Rodemeyer

[11] 3,999,519
[45] Dec. 28, 1976

[54] ROTATABLE FEEDER FOR ANIMALS

[75] Inventor: Donald James Rodemeyer, City Island, N.Y.

[73] Assignee: Metaframe Corporation, Elmwood Park, N.J.

[22] Filed: Oct. 9, 1975

[21] Appl. No.: 621,256

[52] U.S. Cl. .................................. 119/29; 119/15; 119/18; 119/51 R

[51] Int. Cl.² ........................................ A01K 1/00

[58] Field of Search ................... 119/29, 15, 17–19, 119/51 R, 62

[56] References Cited

UNITED STATES PATENTS

| | | | |
|---|---|---|---|
| 3,134,360 | 5/1964 | Lewis | 119/51 R |
| 3,334,614 | 8/1967 | Gass et al. | 119/18 |
| 3,742,908 | 7/1973 | Merino | 119/15 |
| 3,791,346 | 2/1974 | Willinger et al. | 119/17 |
| 3,877,420 | 4/1975 | Eagleson, Jr. | 119/15 |

Primary Examiner—J.N. Eskovitz
Attorney, Agent, or Firm—Max E. Shirk; Stephen L. King; Robert W. Mulcahy

[57] ABSTRACT

Platform is provided with an opening in which a hollow cylindrical member is mounted. The cylindrical member includes an opening for admitting a small animal to the platform and carries a post on which a dome is rotatably mounted with its encompassing sidewall coacting with the platform to cage the animal. The dome carries food compartments depending to a position closely adjacent the platform. An opening in the bottom of each food compartment permits food to be dropped onto the platform beneath the compartment in a position such that the animal must push against the compartment to rotate the dome and expose the food.

5 Claims, 5 Drawing Figures

ROTATABLE FEEDER FOR ANIMALS

BACKGROUND OF THE INVENTION

The background of the invention will be set forth in two parts.

1. Field of the Invention

The present invention pertains generally to the field of animal feeders and more particularly to a new and useful rotatable feeder for small animals, such as hamsters and the like.

2. Description of the Prior Art

U.S. Pat. No. 3,742,908 discloses an animal habitat for observing rodents and the like in a habitat most effectively simulating a natural environment. The habitat includes a central cage and a number of housings which are connected to the central cage by tubular members. These separate housings permit a rodent to perform natural bodily functions such as eating, sleeping, excreting waste material and exercising, all in different locations in a manner as the rodent would normally do selectively if entirely free and in the "wilds". Thus, it is known in the art to provide a separate feeding station in combination with an animal habitat.

This feeding station is provided with a transparent housing having associated therewith a removable perforated lid, a screened base plate at the lower portion thereof and a removable tray for receiving food droppings or the like. The removable perforated lid is associated with the transparent housing in press-fit relation so that the lid may be removed for placing food in the feeding station.

Feeding stations of this type have the disadvantage that a child user may let an animal escape while removing the lid to place food in the housing. Another disadvantage resides in the fact that the animal is rather inactive while feeding; therefore, the child user is not entertained to the extent that he would be if the animal were active while feeding. Yet another disadvantage resides in the fact that the child user may get bit during the feeding operation because rodents take food out of the child user's hand, if the hand is placed inside the feeding station during the feeding operation.

SUMMARY OF THE INVENTION

In view of the foregoing factors and conditions characteristic of feeders for small animals, it is the primary object of the present invention to provide a new and useful feeder not subject to the disadvantages enumerated above and having a rotatable feeding chamber which may be rotated by an animal retrieving food from the feeder.

Another object of the present invention is to provide a new and useful rotatable animal feeder including a stationary platform supporting a small animal, a feeding compartment through which food may be dropped to the animal and a post rotatably mounting the compartment above the platform in such a position that food beneath the compartment may be reached by an animal on the platform only after the animal pushes the compartment away from the food.

According to the present invention, a rotatable feeder for animals is provided. The feeder includes a stationary platform which may be connected to an animal cage by a hollow tube so that an animal may travel from the cage to the platform.

The feeder also includes a dome having an encompassing wall from which a pair of compartments depend into the interior of the dome. This dome is rotatably mounted on a post extending upwardly from the center of the platform so that the dome will enclose the platform while being rotatable with respect to the platform. Each compartment has an open top communicating with the exterior of the dome, a depending, encompassing side wall and a bottom wall. The bottom wall is provided with an opening so that food may be deposited on the platform beneath the compartment. The animal will usually try to retrieve the food from under one of the compartment openings and, in so doing, will push upon the compartment side wall, thereby slowly rotating the dome. Alternatively, food may be wedged in the opening in the compartment bottom wall with part of the food hanging below the compartment just above the platform. The dome and the compartments are preferably made from a transparent material so that the animal may be observed. As the dome slowly rotates about its pivot, it simulates the real-life restaurant which is rotatably mounted on the top of a tall spire and is slowly rotated so that diners may have a 360° view of the terrain beneath the restaurant.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

DESCRIPTION OF THE PREFERRED EMBODIMENT

Figure 1:
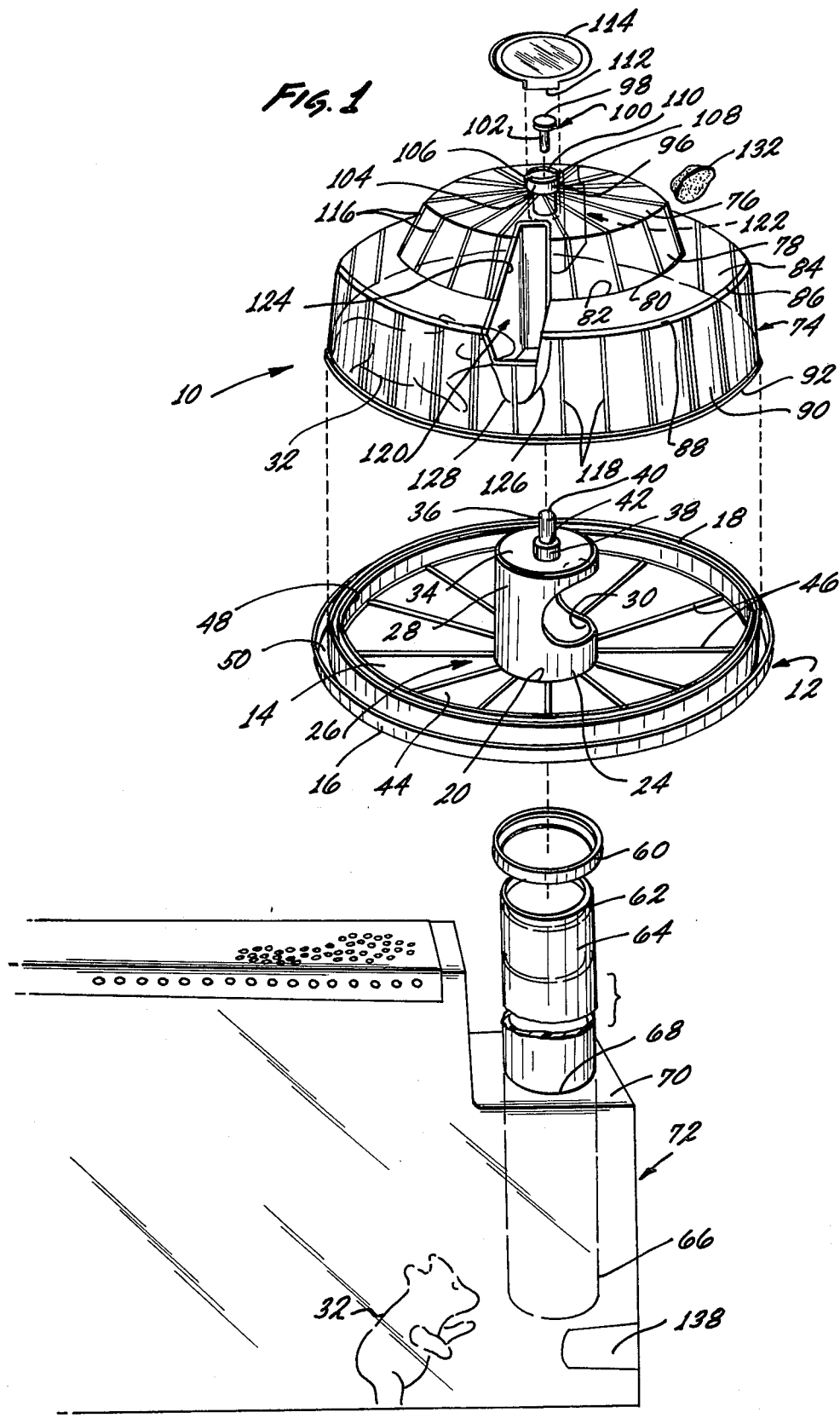
FIG. 1 is an exploded perspective view of a rotatable animal feeder of the present invention.

Referring again to the drawings, a rotatable feeder for animals constituting a presently-preferred embodiment of the invention, generally designated 10, includes a platform 12 having a bottom wall 14, an upstanding side wall 16 and an open top 18. An opening 20 is provided in bottom wall 14 for receiving the open lower end 24 of a hollow cylindrical member 26. Cylindrical member 26 includes an encompassing side wall 28 in which is provided an opening 30 for admitting small animals, such as a rodent or hamster 32, to platform 12. Cylindrical member 26 also includes a top wall 34 which carries an upstanding post 36 having a lower end 38 of a first diameter and an upper end 40 of a second, reduced diameter so that a shoulder 42 is formed intermediate ends 38, 40. The upper surface 44 of bottom wall 14 carries a plurality of radially-extending ribs 46 providing traction for the feet of animal 32.

Platform 12 includes an annular spillage guard or rim 48 which prevents food from being pushed out of platform 12. Rim 48 also prevents urine spillage and is spaced inwardly from side wall 16 sufficiently to form an annular channel 50 for the open bottom portion of an upper housing wall to be hereinafter described so that urine passing over rim 48 will flow down the upper housing wall and collect in channel 50. Platform 12 also includes an annular collar 52 (FIG. 2) which depends from bottom wall 14 around opening 20 for receiving a coupler 60 (FIG. 1) connecting platform 12 to the upper end 62 of a tube 64 having a lower end 66 telescopically mounted in an opening 68 provided in the top wall 70 of an animal cage 72. Animal 32 may move freely from platform 12 to cage 72 by exiting through opening 30, down cylindrical member 26 and through tube 64.

Feeder 10 also includes an upper housing or dome 74 having an upper hemispherical portion 76 formed by an encompassing side wall 78 having a lower edge 80 joined to the inner peripheral edge 82 of an annular wall 84 having its outer peripheral edge 86 joined to the upper edge 88 of a depending cylindrical wall 90 having a lower edge 92 disposed in channel 50 on platform 12.

Dome 74 also includes a depending hollow boss 94 rotatably received on pin 36 for rotatably connecting dome 74 to platform 12. Boss 94 has an upper annular surface 96 against which a head 98 on a pin 100 seats when the shank portion 102 of pin 100 is frictionally engaged in pin 36.

An upstanding cylindrical member 104 is provided on the top of upper dome portion 76 and has a pair of slots 106, 108 provided in its upper end 110 for receiving a tab 112 depending from a sign 114 so that sign 114 will rotate with dome 74. Upper dome portion 76 may be provided with a plurality of reinforcing ribs 116 and side wall 90 may be provided with a plurality of reinforcing ribs 118. The ribs 118 simulate windows in a real-life rotating restaurant; this enhances the entertainment value of feeder 10 by giving a child-user the impression that animal 32 is dining in a rotating restaurant high above a city.

Figure 2:
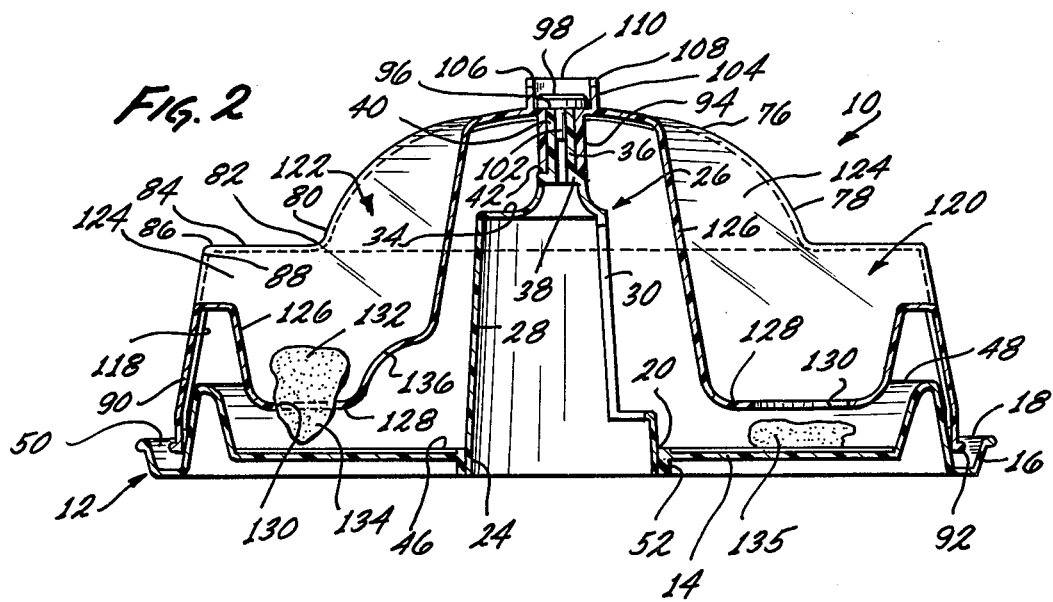
FIG. 2 is a vertical cross-sectional view of the feeder shown in FIG. 1.
Figure 3:
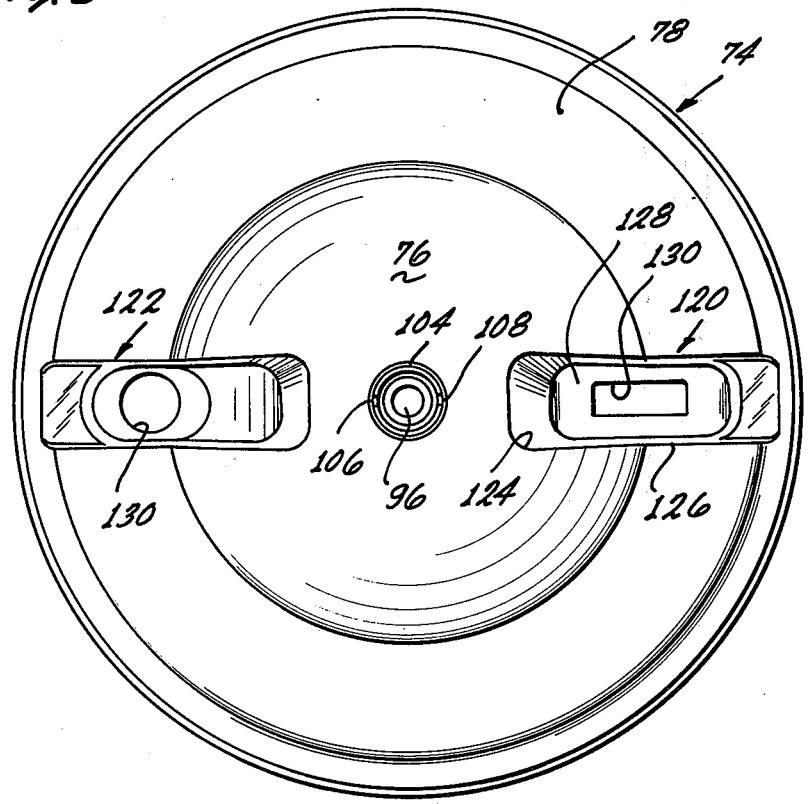
FIG. 3 is a plan view of the dome portion of the feeder shown in FIG. 1.
Figure 4:
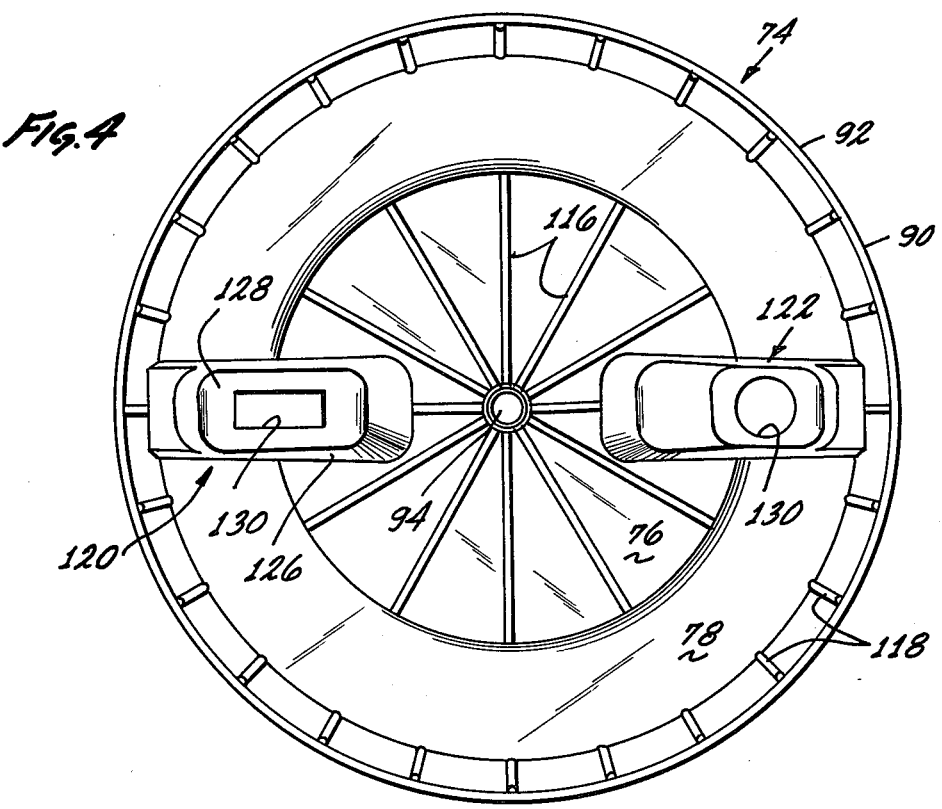
FIG. 4 is a bottom view of the dome shown in FIG. 3.
Figure 5:
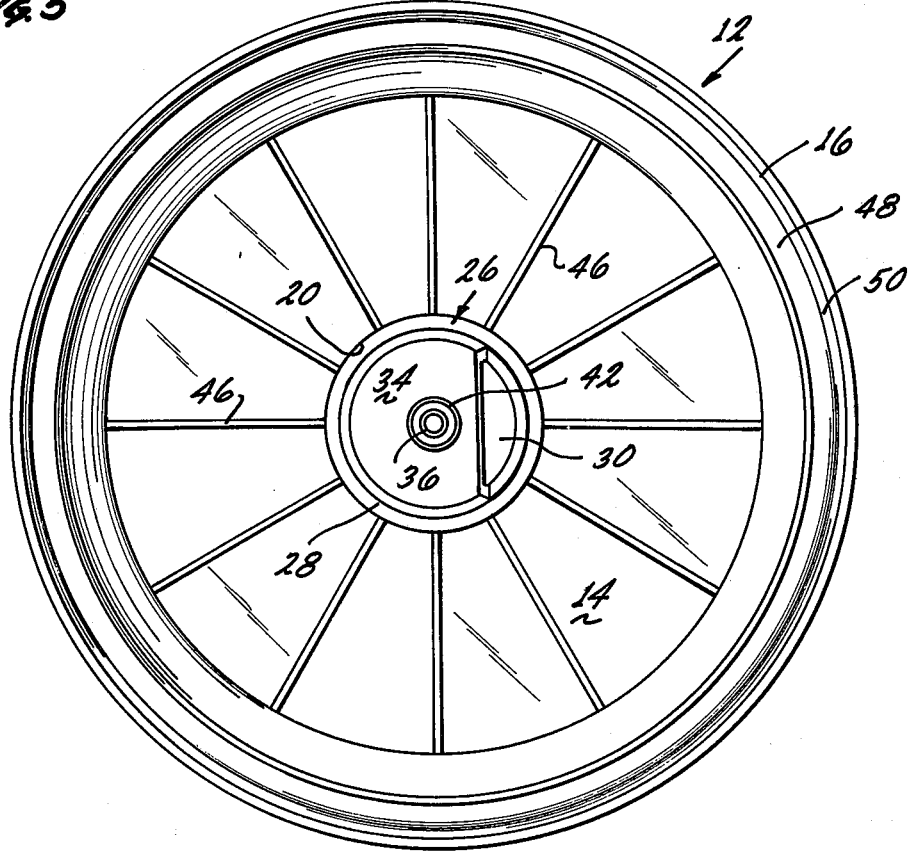
FIG. 5 is a plan view of the platform portion of the feeder shown in FIG. 1.

Dome 74 also includes a pair of feeding compartments 120, 122 each having an open top 124, a depending, encompassing side wall 126 and a bottom wall 128. An opening 130 is provided in bottom wall 128 and is adapted to hold a food particle 132 with its lower end 134 protruding through the bottom of opening 130. As best seen in FIG. 2, a second food particle 135 may be dropped through opening 130 onto platform 12 below compartment 120. It will also be seen in FIG. 2 that side wall 126 of compartment 122 includes an outwardly-bulged portion 136 which is designed to give animal 32 clearance between compartment 122 and cylindrical member 26 so that animal 32 may pass from compartment 122 to compartment 120. Each open top 124 is accessible from the exterior of dome 74 and is large enough to admit the hand of a child-user while side wall 124 and bottom wall 128 protect the hand from animal 32. It will be appreciated by those skilled in the art that a feeding compartment 138 may be used in cage 72 so that a child-user may feed animal 32 in cage 72 without getting bit. It will also be appreciated that openings 130 are too small for animal 32 to escape through compartments 120, 122.

Platform 12 and dome 74 may each be molded as an integral unit from a suitable polymeric material. Additionally, platform 12 and dome 74 may be made from a comparatively transparent material so that an observer may observe animal 32.

Operation of the device will be readily understood. A child-user may place food particles 132, 135 in openings 130 in compartments 120 and 122 or on platform 12 by passing the food particles through the open tops 124 of compartments 120, 122. Assuming that animal 32 is then in cage 72, the animal will be attracted to food particles 132, 135 and leave cage 72 moving up tube 64, through opening 20 in bottom wall 14 and opening 30 in cylindrical member 26. Animal 32 will then move around tray 12 on its upper surface 44 and push against a side wall 126 on one of the compartments 120, 122 while attempting to reach the food. This action automatically rotates dome 74 slowly and this rotation continues as animal 32 retrieves food.

While the particular rotatable animal feeder herein shown and described in detail is fully capable of attaining the objects and providing the advantages hereinbefore stated, it is to be understood that it is merely illustrative of the presently-preferred embodiment of the invention and that no limitations are intended to the details of construction or design herein shown other than as defined in the appended claims which form a part of this disclosure.

Whenever the term "means" is employed in these claims, this term is to be interpreted as defining the corresponding structure illustrated and described in this specification or the equivalent of the same.

What is claimed is:
1. A rotatable animal feeder, comprising:
   1. first means for supporting said animal, said first means being provided with an access opening for said animal;
   2. second means for covering said first means to confine said animal;
   3. third means rotatably mounting said second means on said first means;
   4. fourth means carried by said second means for restricting said animal from a portion of said first means, whereby said animal must push said fourth means away from said portion of said first means to obtain food placed on said portion of said first means; and
   5. fifth means placing said access opening in communication with an animal cage, said first means comprising:
      A. a platform having a bottom wall and an upstanding side wall, said access opening being provided in said bottom wall; and
      B. a spillage guard upstanding from said bottom wall and spaced inwardly from said side wall for forming a channel between said side wall and said spillage guard.
2. A rotatable animal feeder, comprising:
   1. first means for supporting said animal;
   2. second means for covering said first means to confine said animal;
   3. third means rotatably mounting said second means; and
   4. fourth means carried by said second means for restricting said animal from a portion of said first means, whereby said animal must push said fourth means away from said portion of said first means to obtain food placed on said portion of said first means, said third means comprising:
      A. a dome having an encompassing side wall, said fourth means depending from said dome; and
      B. a cylindrical boss depending from said dome, said boss being rotatably mounted on said first means.
3. An animal feeder comprising:

a cage for housing said animal, said cage having an opening provided therein;

a tubular member having one end mounted in said opening in said cage and having a second end;

a platform connected to said second end of said tubular member, said platform having an opening provided therein in communication with said tubular member, whereby said animal has free access to said cage and to said platform;

a pivot pin upstanding from said platform;

an upper housing rotatably connected to said pivot pin, said upper housing including an encompassing side wall having a lower edge extending to a position closely adjacent said platform for caging said animal in said upper housing; and at least one feeding compartment provided in said upper housing, said feeding compartment having an encompassing side wall, an open top and a bottom wall, said bottom wall of said compartment being provided with an opening through which food may be dropped onto said platform below the bottom wall of said compartment, said encompassing side wall on said compartment preventing said animal from having access to said food without pushing said compartment to rotate said upper housing until said compartment moves past said food.

4. A rotatable feeder for animals, comprising:

a platform having a bottom wall, an upstanding side wall and an open top, said bottom wall of said platform having an opening provided therein;

a cylindrical member having an encompassing side wall defining an open end and a closed end, said open end of said cylindrical member being mounted in said opening in said bottom wall of said platform, said encompassing side wall of said cylindrical member being provided with an opening so that an animal may gain access to said platform through said cylindrical member;

a post affixed to said closed end of said cylindrical member; and a dome rotatably mounted on said post, said dome including a side wall having a lower edge disposed adjacent the encompassing side wall on said platform for confining an animal to said platform, said dome also including a pair of feeding compartments each having an open top, an encompassing side wall and a bottom wall, said bottom wall of each feeding compartment extending to a position sufficiently close to said platform that said animal cannot pass between said bottom wall of said compartment and said platform, said bottom wall of said compartment being provided with a small opening through which food may be dropped onto said platform in such a position that said animal must push against said compartment and rotate said dome on said post in order to gain access to said food on said platform.

5. A rotatable feeder as stated in claim 4 including an annular spillage guard on said platform adjacent said platform side wall for forming an annular channel in which said lower edge of said dome side wall is disposed.

* * * * *